US006313546B1

(12) United States Patent
Nishimura et al.

(10) Patent No.: US 6,313,546 B1
(45) Date of Patent: Nov. 6, 2001

(54) POWER SUPPLY ASSEMBLY FOR A VEHICLE

(75) Inventors: Yougi Nishimura; Katsuhiko Kusumoto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/413,184

(22) Filed: Oct. 5, 1999

(30) Foreign Application Priority Data

Apr. 16, 1999 (JP) .................................................. 11-109519

(51) Int. Cl.$^7$ ....................................................... H02J 7/14
(52) U.S. Cl. ............................ 307/9.1; 307/125; 320/104
(58) Field of Search .................................... 307/9.1, 10.1, 307/11, 28, 43, 75, 112, 116, 125; 320/103, 104; 322/7, 89, 28, 90

(56) References Cited

U.S. PATENT DOCUMENTS

| | | | |
|---|---|---|---|
| 5,021,727 | * 6/1991 | Mashino .................................... | 322/7 |
| 5,334,926 | * 8/1994 | Imaizumi .............................. | 320/104 |
| 5,418,401 | * 5/1995 | Kaneyuki .............................. | 307/10.1 |
| 5,731,690 | * 3/1998 | Taniquchi et al. ..................... | 322/28 |
| 5,793,189 | * 8/1998 | Kawagachi et al. ................... | 322/28 |
| 6,229,279 | * 5/2001 | Dierker ................................ | 307/10.1 |

FOREIGN PATENT DOCUMENTS

| | | | |
|---|---|---|---|
| 2136224 A | * 9/1984 | (GB) . | |
| 2317275 A | * 3/1998 | (GB) . | |
| 5-211727 | 8/1993 | (JP) ................................. | H02J/7/16 |
| 5-244730 | 9/1993 | (JP) ................................. | H02J/7/24 |
| 6-351172 | 12/1994 | (JP) ................................. | H02J/7/16 |
| 96/11817 | * 4/1996 | (WO) . | |

* cited by examiner

*Primary Examiner*—Josie Ballato
*Assistant Examiner*—Roberto Rios
(74) *Attorney, Agent, or Firm*—Sughrue, Mion, Zinn, Macpeak & Seas, PLLC

(57) ABSTRACT

A power supply assembly for a vehicle includes a generator connected to an engine of the vehicle; a high-voltage bus to which the output voltage of the generator is supplied and to which a high-voltage load is connected; a low-voltage bus connected to the high-voltage bus via a voltage step-down element and to which a starter motor and a low-voltage load are connected; a high-voltage storage cell which a positive terminal thereof is connected to the high-voltage bus and a negative terminal thereof is grounded via a switch element; a low-voltage storage cell which a positive terminal thereof is connected to the low-voltage bus via a key switch and a negative terminal thereof is grounded; and a controller for controlling the opening and closing of the switch element, wherein the controller is constructed so as to monitor the starting and stopping of the engine based on start and stop signals form the engine, and open the switch element when the stopping of the engine is detected.

2 Claims, 3 Drawing Sheets

POWER SUPPLY ASSEMBLY FOR A VEHICLE

BACKGROUND OF THE INVENTION

1. Field of the Invention

The present invention relates to a power supply assembly for a vehicle having two power supply systems, namely a high-voltage storage cell and a low-voltage storage cell.

2. Description of the Related Art

FIG. 3 is a block diagram showing a conventional power supply assembly for a vehicle.

In FIG. 3, a reference numeral 1 denotes an engine for moving an automobile, a reference numeral 2 denotes a generator connected to and driven by the engine 1; a reference numeral 3 denotes a starter motor for starting the engine 1, a reference numeral 4 denotes an electrical load, constituted by a radio, lamps, etc., a reference numeral 5 denotes a storage cell to which the output voltage of the generator 2 is applied, a reference numeral 6 denotes a key switch, and a reference numeral 7 denotes a controller for monitoring the terminal voltage of the storage cell 5 and regulating the output voltage of the generator 2 based on the terminal voltage of the storage cell 5.

In a conventional power supply assembly for a vehicle constructed in the above manner, when the key switch 6 is closed, closing a starter motor drive switch 9, the voltage of the storage cell 5 is applied to the starter motor 3, current flows though the motor portion of the starter motor 3, and the starter motor 3 begins to rotate. The engine 1 is driven thereby. Then, the generator 2 is driven by the engine 1 and starts to generate power. The output voltage of the generator 2 is regulated, at 14.4 V, for example, and applied to the storage cell 5, serving to recharge the storage cell 5.

When a switch 8 is closed, the terminal voltage of the storage cell 5 is applied to the desired electrical load 4, operating the desired electrical load 4.

Now, the storage cell 5 is depleted by the use of the starter motor 3 and the electrical load 4, decreasing the terminal voltage thereof.

Thus, the controller 7 monitors the terminal voltage of the storage cell 5 and provides ON/OFF control of the excitation current of the generator 2 in response to the terminal voltage, regulating the charging of the storage cell 5.

As indicated above, in the conventional power supply assembly for a vehicle, only one storage cell 5 is mounted, and furthermore, because the storage cell 5 is connected to ground even when the engine 1 is at rest, minute currents flow when the engine is stopped, causing the storage cell 5 to discharge. Furthermore, in a vehicle adopting an idling-stop-and-start system, frequent use is made of the starter motor 3, rapidly depleting the storage cell 5. Thus, one problem has been that the terminal voltage of the storage cell 5 has been reduced by such discharging and rapid depletion, making it impossible to drive the starter motor 3, and therefore to start the engine 1.

In such cases, it is necessary to start the engine by means of the assistance of another vehicle, giving rise to extremely inconvenient situations.

SUMMARY OF THE INVENTION

The present invention aims to solve the above problems and an object of the present invention is to provide a power supply assembly for a vehicle enabling incapacitation of engine starting to be avoided by mounting two power source systems, namely a high-voltage storage cell and a low-voltage storage cell, so that the low-voltage storage cell can be recharged by the high-voltage storage cell when the low-voltage storage cell is depleted.

In order to achieve the above object, according to one aspect of the present invention, there is provided a power supply assembly for a vehicle having: a generator connected to an engine of the vehicle; a high-voltage bus to which the output voltage of the generator is supplied and to which a high-voltage load is connected; a low-voltage bus connected to the high-voltage bus via a voltage step-down element and to which a starter motor and a low-voltage load are connected; a high-voltage storage cell which a positive terminal thereof is connected to the high-voltage bus and a negative terminal thereof is grounded via a switch element; a low-voltage storage cell which a positive terminal thereof is connected to the low-voltage bus via a key switch and a negative terminal thereof is grounded; and a controller for controlling the opening and closing of the switch element. The controller is constructed so as to monitor the starting and stopping of the engine based on start and stop signals form the engine, and open the switch element when the stopping of the engine is detected.

DETAILED DESCRIPTION OF THE PREFERRED EMBODIMENT

The preferred embodiment of the present invention will now be explained with reference to the drawings.

Embodiment 1

Figure 1:
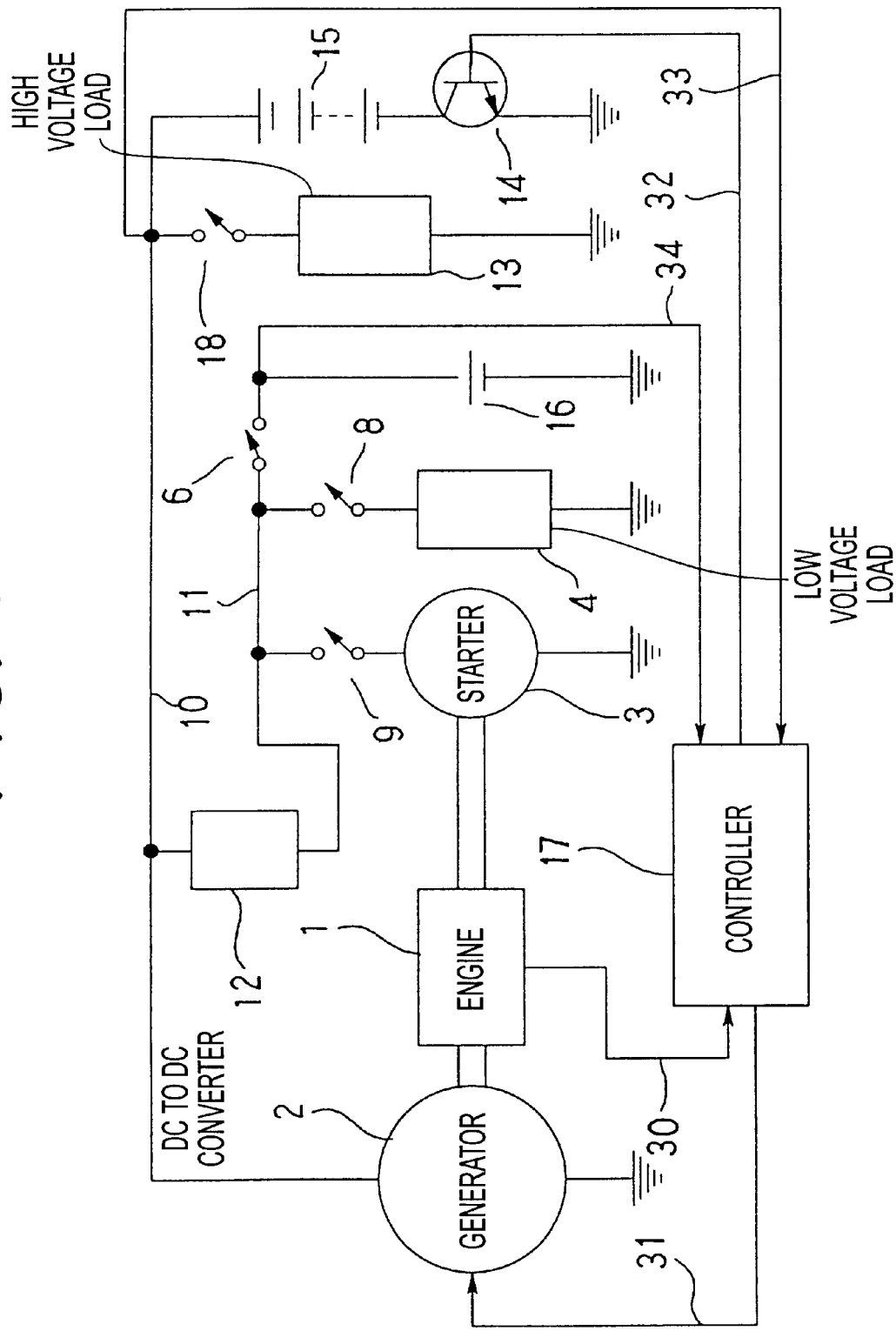
FIG. 1 is a block diagram of a power supply assembly for a vehicle according to Embodiment 1 of the present invention.

FIG. 1 is a block diagram of a power supply assembly for a vehicle according to Embodiment 1 of the present invention.

In FIG. 1, a generator 2 is directly connected to and driven by an engine and generates electricity. The output voltage of the generator 2 is supplied to a high-voltage bus 10. A positive terminal of a high-voltage storage cell 15 is connected to the high-voltage bus 10 and a negative terminal thereof is grounded via a semi-conductor switch 14 served as a switch means. In addition, a high-voltage load 13, consisting of defrosters, etc., is connected to the high-voltage bus 10.

A positive terminal of low-voltage bus 11 is connected to the high-voltage bus 10 via a DC-to-DC converter 12 serving as a voltage step-down means and a negative terminal thereof is grounded. A low-voltage storage cell 16 is connected to the low-voltage bus 11 via a key switch 6. In addition, a starter motor 3 for starting the engine 1 and a low-voltage load 4, consisting of a radio, lamps, etc., are connected to the low-voltage bus 11.

Here, if the output voltage of the generator 2 is 42 V and the cell voltage of the high-voltage storage cell 15 is 36 V, for example, the voltage supplied to the low-voltage bus 11 may be stepped down to 12 V by the DC-to-DC converter 12.

A controller 17 served as a control means is connected via signal lines 30 to 34 to the engine 1, the generator 2, the semi-conductor switch 14, the positive terminal of the high-voltage storage cell 15, and the positive terminal of the low-voltage storage cell 16, respectively. Start and stop signals from the engine 1 are thereby input to the controller 17 via the signal line 30. Furthermore, the terminal voltages of the high-voltage storage cell 15 and the low-voltage storage cell 16 are input to the controller 17 via the signal lines 33 and 34. Then, the controller 17 controls the generation of electricity of the generator 2 by outputting an ON/OFF signal for the excitation current via the signal line 31 based on the start and stop signals from the engine 1 and the terminal voltages of the high-voltage storage cell 15 and the low-voltage storage cell 16, and in addition, controls the ON/OFF state of the semi-conductor switch 14 by outputting an ON/OFF signal for the semi-conductor switch 14 via the signal line 32.

Next, the operation of a power supply assembly for a vehicle constructed in this manner will be explained.

When the key switch 6 is closed, in turn closing a starter motor drive switch 9, the voltage of the low-voltage storage cell 16 is applied to the starter motor 3, a current flows though the motor portion of the starter motor 3, and the starter motor 3 begins to rotate. The engine 1 is driven thereby, and the generator 2 is driven by the engine 1. Then, when an ON signal for the excitation current is output from the controller 17, the generator 2 commences the generation of electricity. The output voltage of the generator 2 is supplied to the high-voltage bus 10, and in addition is stepped down by the DC-to-DC converter 12 and supplied to the low-voltage bus 11. Thus, the high-voltage storage cell 15 connected to the high-voltage bus 10 is recharged, and the low-voltage storage cell 16 connected to the low-voltage bus 11 is also recharged.

When a switch 8 is closed, the terminal voltage of the low-voltage storage cell 16 is applied to the desired low-voltage load 4, activating the desired low-voltage load 4. Similarly, when a switch 18 is closed, the terminal voltage of the high-voltage storage cell 15 is applied to the desired high-voltage load 13, activating the desired high-voltage load 13.

Figure 2:
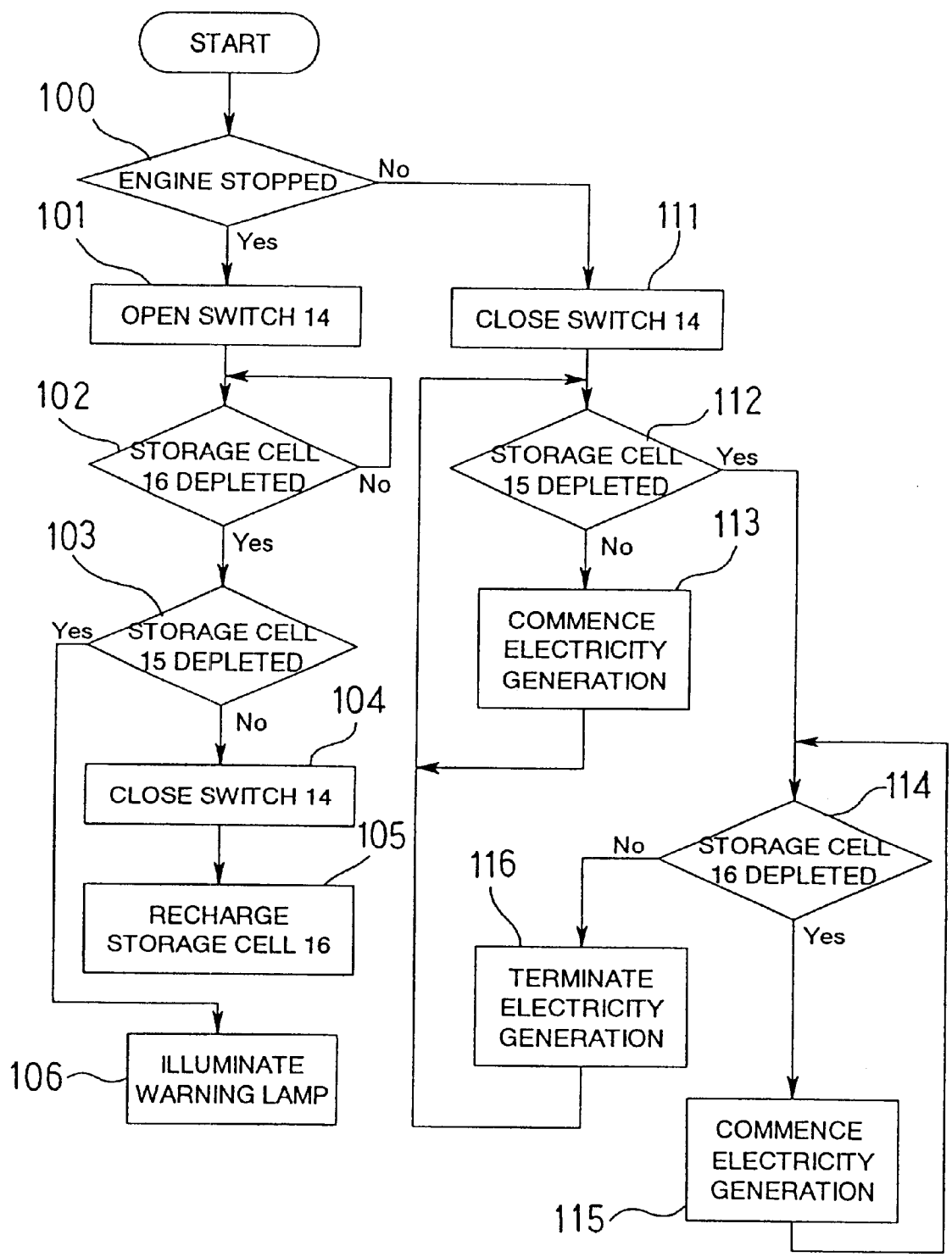
FIG. 2 is a flow chart explaining the operation of the power supply assembly for a vehicle according to Embodiment 1 of the present invention.
Figure 3:
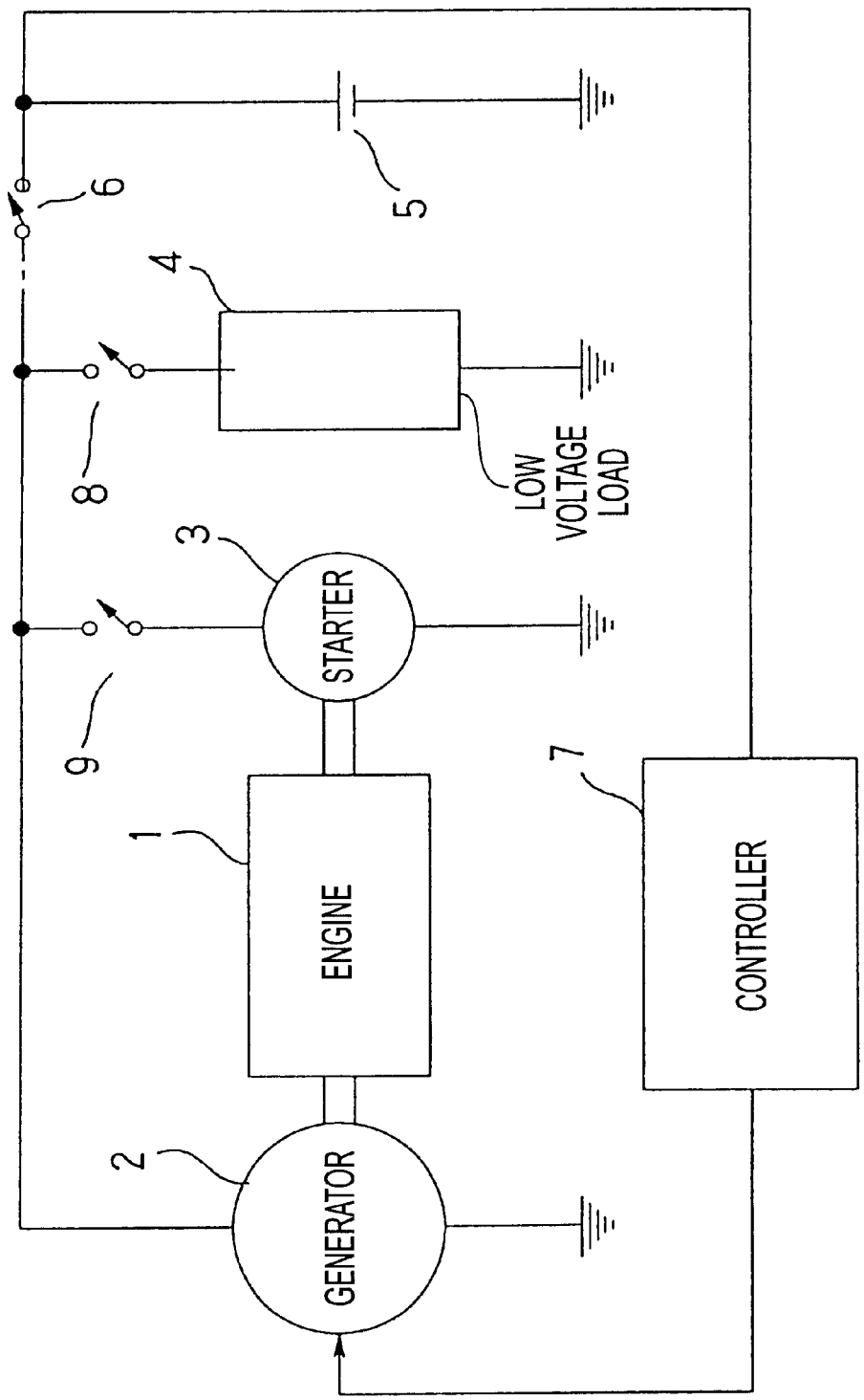
FIG. 3 is a block diagram of a conventional power supply assembly for a vehicle.

Next, control by the controller 17 will be explained with reference to FIG. 2.

First, at Step 100, the controller 17 monitors the starting and stopping of the engine based on start and stop signals from the engine 1 input via the signal line 30.

Then, when stoppage of the engine 1 is detected, the process moves to Step 101, outputting an OFF signal via the signal line 32 to open the semi-conductor switch 14. Electrical connection between the high-voltage storage cell 15 and the vehicle is thereby broken, preventing discharging of the high-voltage storage cell 15.

Then, the process moves to Step 102, to determine whether the low-voltage storage cell 16 is depleted based on the terminal voltage of the low-voltage storage cell 16 input via the signal line 34. At step 102, if the terminal voltage of the low-voltage storage cell 16 is less than a set value, the low-voltage storage cell 16 is deemed to be depleted and the process moves to Step 103, to determine whether the high-voltage storage cell 15 is depleted based on the terminal voltage of the high-voltage storage cell 15 input via the signal line 33. At step 103, if the terminal voltage of the high-voltage storage cell 15 is greater than a set value, the high-voltage storage cell 15 is deemed to be normal, and the process moves to Step 104, outputting an ON signal via the signal line 32 to close the semi-conductor switch 14. The terminal voltage of the high-voltage storage cell 15 is thereby applied to the low-voltage storage cell 16, recharging the low-voltage storage cell 16 (Step 105). Thus, activation of the starter motor 3 by closing the starter motor drive switch 9 can be performed without hindrance.

Furthermore, at Step 103, if the terminal voltage of the high-voltage storage cell 15 is less than the set value, the high-voltage storage cell 15 is deemed to be depleted and the process moves to Step 106, illuminating a warning lamp (not shown) indicating that the battery is running low. Then, the occupant confirms the illumination of the warning lamp, and starts the starter motor 3 with an external battery (with the assistance of another vehicle, etc.)

Furthermore, at Step 100, when starting of the engine 1 is detected, the process moves to Step 111, outputting an ON signal via the signal line 32 to close the semi-conductor switch 14. Thereafter, the process moves to Step 112, to determine whether the high-voltage storage cell 15 is depleted based on the terminal voltage of the high-voltage storage cell 15 input via the signal line 33. At Step 112, if the terminal voltage of the high-voltage storage cell 15 is less than the set value, the high-voltage storage cell 15 is deemed to be depleted and the process moves to Step 113, outputting an ON signal for the excitation current via the signal line 31, and the generator 2 commences the generation of electricity. The high-voltage storage cell 15 and the low-voltage storage cell 16 are thereby recharged.

Furthermore, at Step 112, if the terminal voltage of the high-voltage storage cell 15 is greater than the set value, the high-voltage storage cell 15 is deemed to be normal and the process moves to Step 114, to determine whether the low-voltage storage cell 16 is depleted based on the terminal voltage of the low-voltage storage cell 16 input via the signal line 34. At Step 114, if the terminal voltage of the low-voltage storage cell 16 is less than the set value, the low-voltage storage cell 16 is deemed to be depleted and the process moves to Step 115, outputting an ON signal for the excitation current via the signal line 31, and the generator 2 commences the generation of electricity. The low-voltage storage cell 16 is thereby recharged via the DC-to-DC converter 12.

Furthermore, at Step 114, if the terminal voltage of the low-voltage storage cell 16 is greater than the set value, the process moves to Step 116, outputting an OFF signal for the excitation current via the signal line 31, terminating the generation of electricity by the generator 2.

Thus, when the engine 2 is running, the terminal voltages of the high-voltage storage cell 15 and the low-voltage storage cell 16 are each maintained at set values.

Because, according to the present invention, a high-voltage storage cell 15 and a low-voltage storage cell 16 are provided, and if the low-voltage storage cell 16 is depleted when the engine 1 is stopped, a semi-conductor switch 14 is closed so that the terminal voltage of the high-voltage storage cell 15 can be applied to the low-voltage storage cell 16 in this manner. Consequently, even if the terminal voltage of the low-voltage storage cell 16 is excessively reduced for some reason, the low-voltage storage cell 16 is promptly recharged, preventing in advance the risk of incapacitation of the activation of the starter motor 3, and therefore preventing incapacitation of the starting of the engine 1.

Furthermore, because the electric potential of the high-voltage storage cell 15 is high compared to the low-voltage storage cell 16, there is an increased possibility of discharging due to minute leakages of current, etc. However, because the semi-conductor switch 14 is designed to be open when the engine 1 is stopped, electrical connection between the high-voltage storage cell 15 and the vehicle is thereby broken, enabling discharging of the high-voltage storage cell 15 to be prevented. Consequently, the terminal voltage of the high-voltage storage cell 15 is maintained, the high-voltage load 13 can be operated stably. Even if the terminal voltage of the low-voltage storage cell 16 is excessively reduced for some reason, the low-voltage storage cell 16 is promptly recharged, enabling the occurrence of incapacitation of the starting of the engine 1 to be suppressed. Thus, it is possible to avoid situations where the engine 1 must be started with the assistance of another vehicle (external battery).

Moreover, in Embodiment 1, a semi-conductor switch 14 is given as a switch means, but the switch means is not limited to the semi-conductor switch 14, and a relay or the like may be used, for example.

According to the present invention, there is provided a power supply assembly for a vehicle having: a generator connected to an engine of the vehicle; a high-voltage bus to which the output voltage of the generator is supplied and to which a high-voltage load is connected; a low-voltage bus connected to the high-voltage bus via a voltage step-down means and to which a starter motor and a low-voltage load are connected; a high-voltage storage cell which a positive terminal thereof is connected to the high-voltage bus and a negative terminal thereof is grounded via a switch means; a low-voltage storage cell which a positive terminal thereof is connected to the low-voltage bus via a key switch and a negative terminal thereof is grounded; and a control means for controlling the opening and closing of the switch means. The control means is constructed so as to monitor the starting and stopping of the engine based on start and stop signals form the engine, and open the switch means when the stopping of the engine is detected. Thus, because the electrical connection between the high-voltage storage cell and the vehicle is broken when the engine is stopped, preventing discharging of the high-voltage storage cell. Consequently, the low-voltage storage cell can be recharged by the high-voltage storage cell when the low-voltage storage cell is depleted, providing a power supply assembly for a vehicle enabling incapacitation of the starting of the engine to be avoided.

In addition, because the control means is constructed so as to monitor the positive terminal voltages of the high-voltage storage cell and close the switch means when depletion of the low-voltage storage cell and the stopping of the engine are detected, even if the terminal voltage of the low-voltage storage cell is excessively reduced for some reason, the low-voltage storage cell is promptly recharged, preventing in advance the risk of incapacitation of the starting of the engine.

What is claimed is:

1. A power supply assembly for a vehicle comprising:

a generator connected to an engine of the vehicle;

a high-voltage bus to which the output voltage of said generator is supplied and to which a high-voltage load is connected;

a low-voltage bus connected to said high-voltage bus via a voltage step-down means and to which a starter motor and a low-voltage load are connected;

a high-voltage storage cell which a positive terminal thereof is connected to said high-voltage bus and a negative terminal thereof is grounded via a switch means;

a low-voltage storage cell which a positive terminal thereof is connected to said low-voltage bus via a key switch and a negative terminal thereof is grounded; and a control means for controlling the opening and closing of said switch means, wherein said control means is constructed so as to monitor the starting and stopping of said engine based on start and stop signals form said engine, and open said switch means when the stopping of said engine is detected.

2. The power supply assembly for a vehicle according to claim 1 wherein said control means is constructed so as to monitor the positive terminal voltage of said high-voltage storage cell, and close said switch means when depletion of said low-voltage storage cell and the stopping of said engine are detected.

* * * * *